United States Patent [19]

McCorkle et al.

[11] Patent Number: 4,463,023
[45] Date of Patent: Jul. 31, 1984

[54] METHOD FOR PRODUCING BLACK RIPE OLIVES

[75] Inventors: Kenneth C. McCorkle, Visalia; Horace M. Wells, Porterville; Hershell D. Scrimshire, Farmerville; Robert N. Beckwith, Dinuba, all of Calif.

[73] Assignee: Early California Foods, Inc., Visalia, Calif.

[21] Appl. No.: 337,358

[22] Filed: Jan. 6, 1982

Related U.S. Application Data

[63] Continuation of Ser. No. 197,390, Oct. 16, 1980, abandoned.

[51] Int. Cl.³ .......................... A23B 7/00; A23L 1/27
[52] U.S. Cl. ....................................... 426/270; 99/534; 426/302; 426/615; 426/519
[58] Field of Search .............. 426/615, 270, 262, 263, 426/302, 321, 519

[56] References Cited

U.S. PATENT DOCUMENTS 2,464,947  3/1949  Sammis et al. ...................... 426/302
2,582,371  1/1952  Ball et al. ............................. 426/270
3,085,881  4/1963  Ball ...................................... 426/615

OTHER PUBLICATIONS

Woodroof et al., "Olives", Commercial Fruit Processing published by the AVI Publishing Company, Inc., pp. 204–217 (1975).
Cruess, Commercial Fruit and Vegetable Products, published by the McGraw-Hill Book Company, pp. 206–216 (1958).

Primary Examiner—George Yeung
Attorney, Agent, or Firm—Nilsson, Robbins, Dalgarn, Berliner, Carson & Wurst

[57] ABSTRACT

A method and apparatus for producing black ripe olives is provided which comprises periodically introducing an alkaline solution, having a concentration of about 0.45% to 0.7% alkaline for fresh cure olives and 0.9% to 1.2% for storage olives, into a processing tank containing olives to be processed. The olives are agitated in the solution and thereafter the solution is drained from the tank leaving the olives dry in the tank for a period of time before reintroducing the alkaline solution. After repeating the wet-dry cycle a number of times, the blackened ripe olives are rinsed with fresh water. The alkaline solution contains lye (sodium hydroxide) and is retained in a separate storage tank at the completion of each period of wetting the olives. The alkaline solution is periodically strengthened to a desired concentration. The agitation results from bubbling high pressure air into the processing tank below the olives. The bottom of the tank is corrugated and air is introduced along the valleys of the corrugations to provide improved agitation. Carbon dioxide is added to the rinse water to neutralize the alkalinity of the blackened ripe olives at the end of the process.

7 Claims, 7 Drawing Figures

METHOD FOR PRODUCING BLACK RIPE OLIVES

This is a continuation, of application Ser. No. 197,390, filed Oct. 16, 1980, now abandoned.

BACKGROUND AND SUMMARY OF THE INVENTION

Current methods and apparatus for "wet" processing olives to obtain black ripe olives employ about 10,000 gallons of fresh water per ton of olives and require continuous air circulation and around-the-clock skilled processing labor. Olives are known to undergo oxidation, and thus change from bright green to shiny black, in the presence of oxygen under alkaline conditions. Conventional wet processes achieve this oxidation by saturating an alkaline solution with air. The olives are immersed in the solution and subsequently rinsed with fresh water to rinse the alkaline solution from the surface of the olives. This continual rinsing with nonalkaline water consumes a tremendous amount of water. Compressed air is also supplied to the vessel containing the olives in the alkaline solution during the entire five to seven day period of lye applications in the conventional wet processes.

More specifically, during this five to seven day period, sodium hydroxide, typically in a 1.2 percent solution, is applied to the olives by adding the solution to a tank containing the olives. The olives are immersed in the alkaline solution for periods of from 2 to 24 hours over four to seven days, depending on whether the olives have been stored in a brine solution (storage olives) or are fresh olives. Between each such application the sodium hydroxide is rinsed from the olives by a succession of from 2 to 8 fresh water rinses. This accounts for the enormous quantity of water necessary in the conventional wet process and apparatus.

Traditionally the lye, i.e., sodium hydroxide, applications and rinses are performed manually, making the conventional process very labor intensive. Lye applications for extended periods of time at a concentration of about 1.2% necessitate frequent sampling of the olives to monitor the color change and penetration into the olive meat of the dark color, known in the art as the "oxidation ring."

A "dry" process has also been known in the art prior to the described air agitation technique. In this previous dry process, the olives were immersed in a lye solution for 2–3 hours at a concentration of about 1.0 to 1.2 percent alkaline solution. This was followed by draining the solution from the tank and leaving the olives essentially dry for approximately 24 hours except for a rinse for about ten minutes every hour. During the rinse, the olives were stirred manually with paddles. This lye application followed by the dry oxidation with intermittent stirring rinses was repeated over a three to five day period until the desired characteristics of blackened olives were achieved.

The rinse steps with nonalkaline water, however, again involved use of many thousands of gallons of water.

There has been, therefore, a need to produce black ripe olives which have the same qualities as the olives produced by conventional processes, while at the same time reducing the water and compressed air used as well as the labor requirements.

SUMMARY OF THE INVENTION

Recognizing the need for an improved method and apparatus for processing green olives into ripe black olives, the present invention provides a novel method and apparatus which minimizes or reduces the problems previously noted.

The present invention relates to a method and apparatus for producing black ripe olives by repeated applications of a relatively low concentration alkaline solution for a relatively short period of time followed by draining the solution and leaving the olives in the processing tank exposed to air without the presence of alkaline solution. This produces the suprising result of obtaining black ripe olives of the desired characteristics without rinsing between lye applications and with relatively low strength lye solution. Also, an automated system for setting the oxidation ring which requires little monitoring during the lye applications is now possible. The processing tank is also of a novel construction facilitating the circulation of the olives during lye applications.

More particularly, the present invention relates to a method and apparatus for producing black ripe olives. An alkaline solution, having a concentration of about 0.45% to 0.7% for fresh olives and 0.9% to 1.2% for olives stored in brine is introduced into a processing tank containing the olives to be processed. The olives are agitated in the solution with air. After a brief period of four to five minutes, the alkaline solution is drained from the tank and the olives are left dry in the tank for the remainder of the cycle of approximately one-half hour. This same process is repeated each cycle, until the desired color and penetration of the color, i.e., oxidation ring, into the meat of the olive is achieved. The tank of the present invention is of a special design and has a corrugated bottom with air inlet holes running along the length of the valleys created by the corrugation. This construction improves the circulation of the olives during the agitation by the compressed air coming into the tank through the air inlet holes.

Additional features of the invention will be described hereafter and will also form the subject of the appended claims. These other features and advantages of the present invention will become more apparent with reference to the following detailed description of a preferred embodiment taken in connection with the accompanying drawings, in which:

DETAILED DESCRIPTION OF A PREFERRED EMBODIMENT

Figure 1:
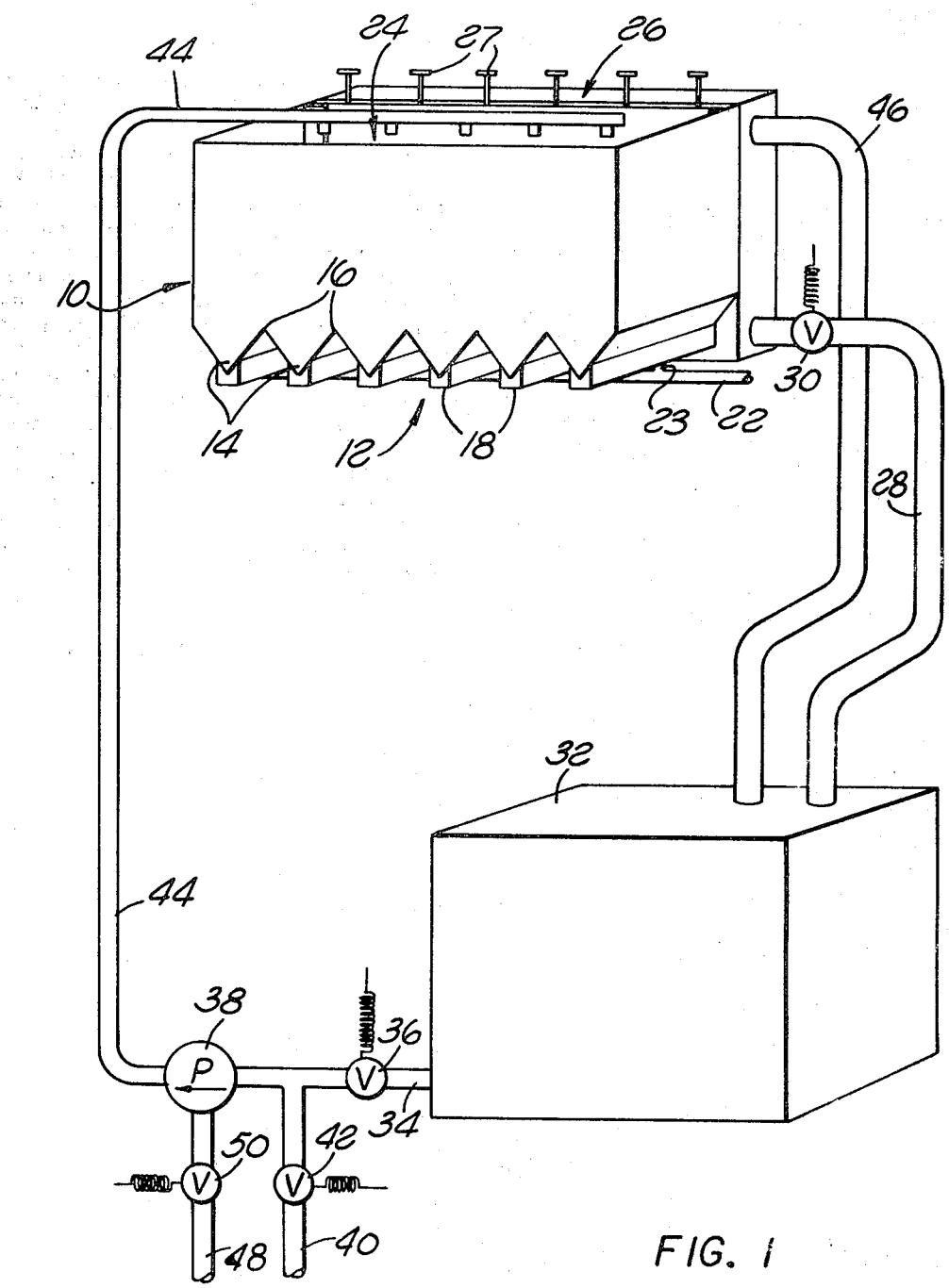
FIG. 1 shows a perspective and partially schematic view of the apparatus for carrying out the method of the present invention.

Turning now to FIG. 1, a processing tank 10 has a bottom 12 made up of a plurality of corrugations forming valleys 14 and peaks 16 which extend across the tank bottom 12. An air manifold 18 extends along the external portion of the bottom of each valley and encloses the bottom of the respective valley 14. Manifolds 18 are connected to a pressurized air supply line 22 by manifold supply lines 23. When the air supply line 22 is pressurized, the air flows into the air manifolds 18. A plurality of holes 60 (shown in FIG. 6) along the length of valleys 14, allow the pressurized air to enter into the tank 10. The air entering at the bottom of the valleys 14 bubbles upwardly through whatever fluid and olives are present. A gate 24 separates one end of the processing tank 10 from a drain flume 26.

An alkaline solution drain line 28 connects the bottom of the flume 26 through a solenoid operated valve 30 to an alkaline solution storage tank 32. The storage tank 32 is positioned at a level lower than the processing tank 10 so that gravity will drain the alkaline solution from the processing tank 10 into the alkaline storage tank 32. The bottom of the alkaline storage tank 32 is connected by an alkaline supply line 34 and a solenoid operated valve 36 to the suction of a pump 38 which may be, for example, a centrifugal pump. The suction of the pump 38 is also connected to a fresh water supply line 40 (source not shown) through a solenoid operated valve 42. The outlet of the pump 38 is connected to a processing tank feed line 44 which discharges above each valley 14. An overflow line 46 is connected to the top of the flume 26 and discharges into the alkaline solution storage tank 32.

A carbon dioxide supply line 48, connected to a source of carbon dioxide (not shown), is connected through solenoid operated valve 50 to the volute (not shown) of the pump 38. Cavitation in the centrifugal rotor (not shown) of the pump 38 assists in placing the carbon dioxide solution in the fresh water rinse during one phase of the process of the present invention.

Figure 2:
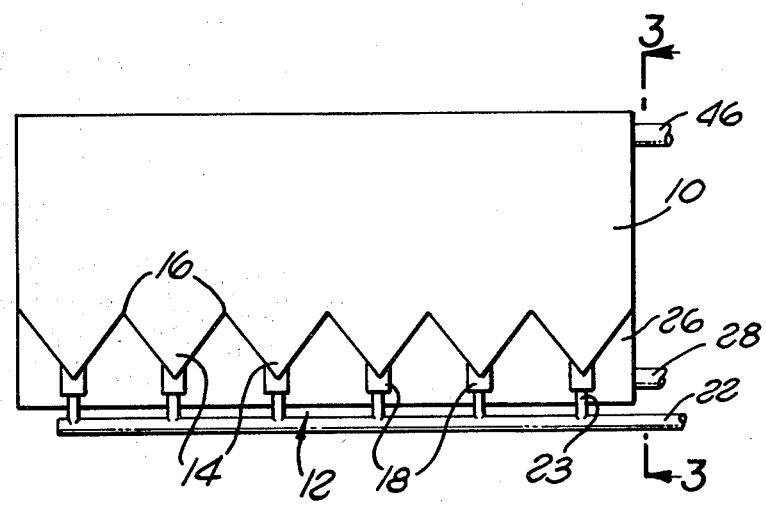
FIG. 2 shows a front elevational view of the processing tank of the present invention showing the corrugated bottom thereof and the air inlet manifold.
Figure 3:
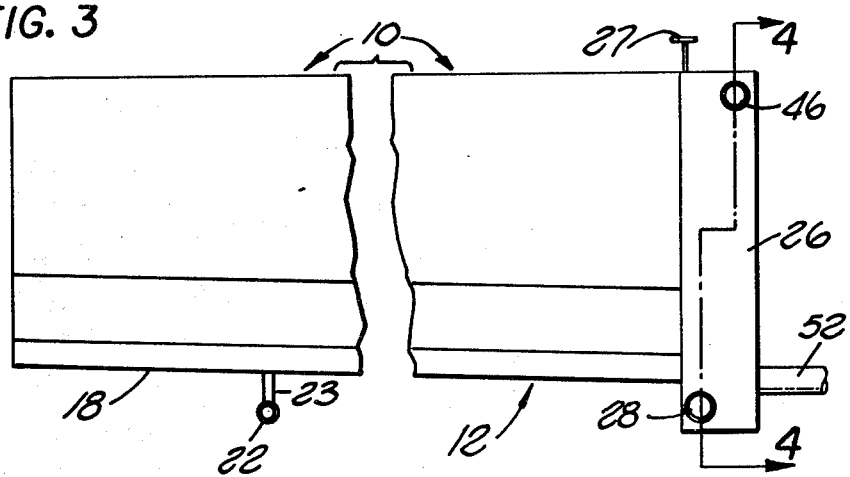
FIG. 3 shows a side elevational view of the processing tank taken along the line 3—3 of FIG. 2 showing the slope of the corrugated bottom and the outlet flume at the end of the tank.
Figure 4:
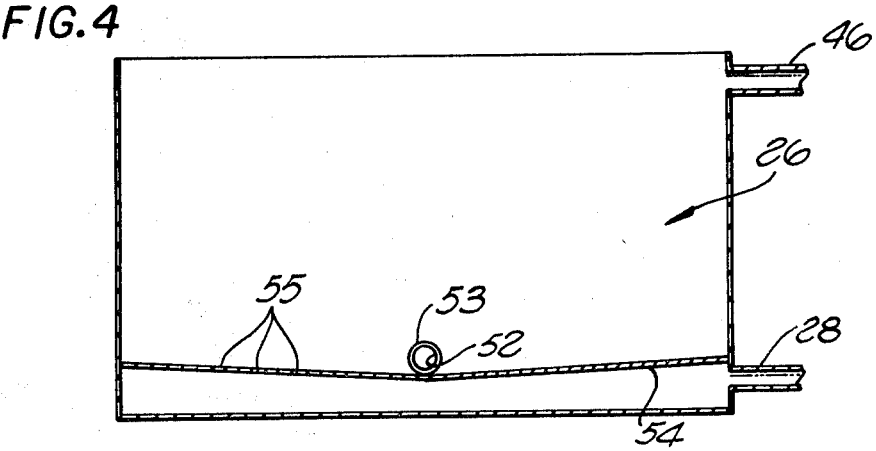
FIG. 4 shows a cross-sectional view of the flume taken along line 4—4 of FIG. 3.

FIG. 2 shows the manifold supply lines 23 connecting the air supply line 22 to the air manifolds 18. FIG. 3 shows the processing tank bottom 12 sloping downwardly towards the end of the processing tank 10 on which the flume 26 is disposed. As shown in FIG. 4, the flume 26 has a perforated bottom 54 having perforations 55 therein, and which allows the liquid to reach the inlet of the alkaline drain line 28 while still providing a guide for the olives toward the olive drain line 52. The perforated bottom 54 slants downwardly towards the center of the flume 26 where an olive drain line 52 is attached to the flume 26, through an opening 53 in the flume 26 wall for draining the olives from the processing tank 10. In addition, the perforations may be made small enough to strain olive particles and thus prevent particles from entering the lye tank.

The discharge of the tank feed line 44 above each valley can be used to wash olives into the flume. For example, valve 30 may be partially opened to allow some solution to drain into tank 32 while at the same time olives can be pumped out line 52. By recirculating solution through line 44, the valleys can be washed out to assist in discharging olives into the flume.

Figure 5:
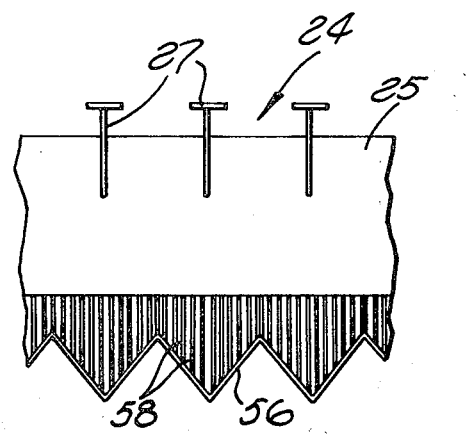
FIG. 5 shows a portion of the gate which separates the olive containing portion of the processing tank from the flume.

FIG. 5 shows a portion of the gate 24 which is formed by a plate 25 having attached to the bottom end thereof a plurality of spaced apart vertical rods 58. The rods 58 are joined together at their terminal ends by rods 56 forming a corrugated shape. This corrugated shape conforms to the corrugations at the flume 26 end of the processing tank 10. The spaced apart rods 58 allow solution to pass between the flume 26 and processing tank 10 without allowing olives to pass. When it is desired to allow the olives to pass into the flume 26, the gate 24 is raised by the simultaneously raising all of the handles 27 and vertically lifting the gate 24 to open a passage for the olives to pass into the flume 26 from the processing tank 10.

Figure 6:
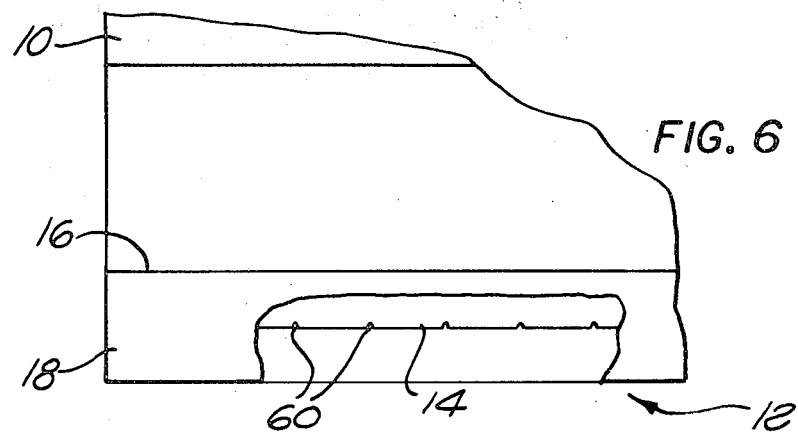
FIG. 6 shows an enlarged partially cut away side elevational view of the bottom right hand front corner of the processing tank shown in FIG. 1; and, FIG. 7 is a schematic view showing the olive circulation within the processing tank under the air agitation created by the air bubbles rising from the valleys and peaks of the corrugated bottom of the processing tank of the present invention.

In FIG. 6 it can be seen that the bottom of each valley 14 (one of which is shown in FIG. 6) has a plurality of spaced apart holes 60, each about $\frac{1}{8}''$ in diameter, drilled through the bottom at the point of the valley to allow air from the manifold 18 to enter the processing tank 10 along the length of the bottom of the valley 14. The holes 60 are spaced apart center to center, a distance of about 2 inches along the length of each valley 14.

Figure 7:
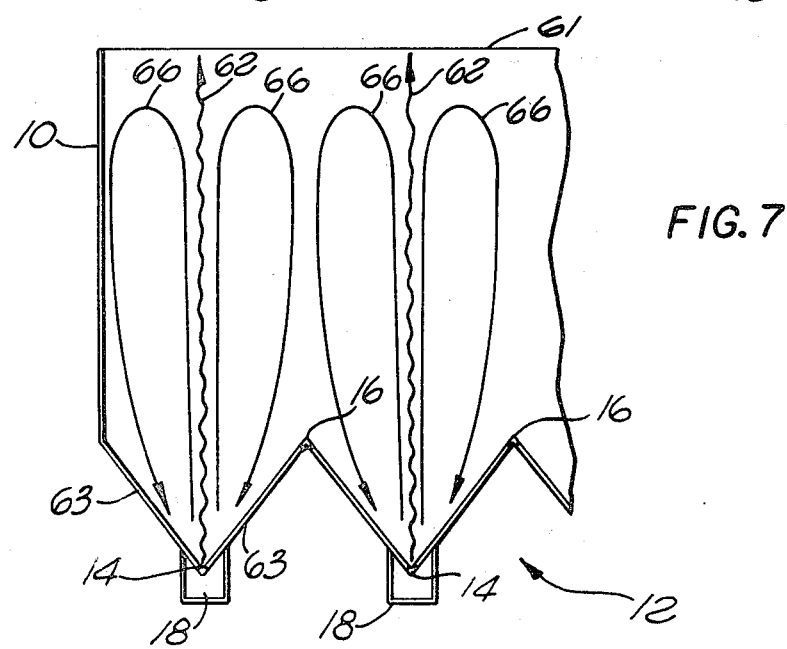

FIG. 7 is a schematic view illustrating the effectiveness of the corrugated bottom 12 combined with the compressed air injected along the valleys in improving the agitation of the olives in the processing tank 10. With the corrugated bottom 12, the olives will tend to concentrate in the valleys 14 above the plurality of holes 60 connecting the manifolds 18 to the processing tank 10. When the manifolds 18 are pressurized a sheet or curtain of air bubbles 62 will rise along the entire length of the bottom of each valley 14 towards the surface 61 of the solution in which the olives are immersed. The rising curtain of air bubbles 62 will cause the olives in the processing tank 10 directly above the bottom of each valley 14 to migrate upwardly. Olives located along the sloping sides 63 of the valleys 14 will then fall towards the space previously occupied by the olives lifted by the air curtain 62, i.e., toward the bottom of the valley 14. A uniform distribution and circulation of the olives from bottom to top through the processing tank 10 will result. Very little, if any, damage will result to any of the olives from lack of movement of the olives in the tank during the application of the lye.

The method according to the present invention comprises the periodic application of a lye solution at about 65° F. at a strength of approximately 0.7% by weight. The lye solution is pumped from the lye supply tank 32 by the opening of solenoid valve 36 and the starting of pump 38. The processing tank 10 is rapidly filled above the level of the olives with the level of the solution being typically about 1.5-2 times the level of the olives. The level of the olives in the processing tank 10 is determined, as is known in the art, in order to avoid mashing the olives which lay towards the bottom of the processing tank 10 and insufficient agitation of the olives. Pressurized air at approximately 2 pounds per square inch is then supplied to the manifolds 18 through the manifold air supply lines 23 from the air supply line 22. The agitation circulation patterns 66 shown in FIG. 7 are thus developed. The lye solution with the air agitation is kept in the tank for only a brief period of time, on the order of 4 to 5 minutes, after which the solenoid valve 30 is activated to rapidly drain the alkaline solution from the processing tank 10 to the lye storage tank 32. During the lye application, the pump 38 may be continuously activated, relying on the overflow line 46 to return excess alkaline solution to the storage tank 32, or the pump 38 and solenoid valve 36 may be activated for a preselected time sufficient to fill the processing tank 10 to a desired level. Alternatively, a level sensing apparatus (not shown), well known in the art of recirculation systems, may be used to shut off the pump 38 when a desired level is detected in the processing tank 10. Means are provided e g., a heater (not shown) and a temperature sensor (not shown) and associated controller (not shown) for the heater, which may be positioned in the storage tank 32 or the processing tank feed line 44, to heat the alkaline solution to a desired temperature prior to each lye application. Preferably the lye is maintained at 66° F. As is known in the art, the temperature may be varied with differing lye concentrations for optimum oxidation ring formation. For fresh olives, 0.7% lye at 65° F. and 0.45% lye at 75° F. is preferred. For storage olives, 1.2% lye at 65° F. and 0.9% lye at 75° F. is preferred.

The olives are then left dry in the processing tank 10 for the about 25–26 minutes remainder of the approximately 30 minute cycle. The approximately 30-minute cycle is then repeated a plurality of times for a total of approximately 3 days. The olives are checked manually at approximately 24-hour intervals during the 3-day period by selecting a few of the olives and cutting them parallel to the longitudinal axis of the pit to check the oxidation ring penetration through the skin of the olive and into the meat of the olive. Typically the first lye application, for the brief period of time approximating 5 minutes, will barely crack the skin of the olives with a color penetration on the order of 1 to 2 thousandths of an inch. Each further lye application will progressively increase both the shade of the color, from brown to black, and the penetration of the color into the meat of the olives. Between a one-sixteenth and three-sixteenth inch penetration of the oxidation ring will be set into the olives over the course of the 3-day period. Once the color has been set in the oxidation ring to the desired level of penetration into the meat of the olive, a sustained 24-hour lye application is put into the tank with a lye concentration of approximately 1.2 to 1.3 percent by weight, which is the usual so-called "pit-lye" application, well known in the art.

The alkaline residue is then rinsed from the olives by repeated fresh water rinses over the course of approximately a 24-hour period, as is well known in the art. Carbon dioxide is placed in solution in the rinse water. The present invention injects the carbon dioxide in the pump 38 where cavitation in the pump 38 centrifugal rotor, at the point of injection of the carbon dioxide provides for better distribution of the carbon dioxide in solution in the rinse water.

The remainder of the olive treatment process is also well known in the art and consists of pasteurizing the olives in a heated water bath of approximately 140°, to 160° F. for approximately 24 hours, followed by approximately a 24-hour period in which the olives are cooled along with the heated pasteurizing water. The gate 24 is then lifted so that the olives roll down the sloping bottom of the tank into the flume. Since the flume floor 54 is sloped towards the center, the olives are directed to the opening 53 of the outlet pipe 52. The olives are pumped out through the outlet pipe 52 with some of the solution while the rest of the solution may drain through the flume floor holes 55 to be pumped out through drain line 28. The olives are pumped out through the drain 52 by means of a pump (not shown) connected to the drain line 52.

The above-described process may be modified depending upon the type of olives in the tank. The lye application is necessary for approximately a 5-day period in order to achieve the desired color and oxidation ring penetration characteristics when the olives are fresh olives, whereas the above-described process, using only a 3-day period before the "pit-lye" application, is useful for storage olives.

A very simple control system can be used to automatically carry out the cycling of lye application and dry processing according to the present invention. A timer (not shown), having minute gradations is used to activate the pump 38 and open solenoid-operated valve 36. In the simplest form of control system, the pump 38 is activated for a preselected time determined to be sufficient to fill the processing tank 10 to a desired level or allowed to continuously run during the lye application, relying upon the overflow line 46 to maintain the desired level in the processing tank 10. Alternatively, a level sensor (not shown) could be placed in the processing tank to provide a control signal to deactivate the pump 32 and shut solenoid operated valve 36 when the desired level is reached. At the end of a desired period, on the order of 4 to 5 minutes, the pump 38 is deactivated, if not already deactivated, and solenoid-operated valve 36 is shut, if not already shut. Drain valve 30 is opened at this time by activating its solenoid thus draining the alkaline solution from the processing tank 10 to the storage tank 32. After about 25 more minutes, as explained above, the cycle is repeated with the control system timer shutting valve 30 and opening valve 36 and activating pump 38.

It will be appreciated that in constructing a method and apparatus for producing black ripe olives, according to the present invention, certain significant advantages are provided.

In particular, the milder concentrations of the alkaline solution, the short exposures of the olives to the alkaline solution used in the lye applications, and the improved agitation characteristics of the processing tank all decrease the need for the essentially continuous monitoring of the coloring and oxidation ring penetration of the olives which exists in the prior art dry process. The large amounts of water necessary for the stirring rinses in the prior art dry and wet processes have also been eliminated in the method and apparatus of the present invention. The labor necessary to essentially continuously monitor the oxidation of the olives in the prior art processes, and to carry out the steps of making the lye application, draining the lye solution, applying the stirring rinses, along with carrying out the stirring, and to reapply the lye application have been eliminated by the method and apparatus of the present invention. The corrugated bottom of the processing tank provides a significant improvement in the circulation of the olives in the processing tank under the influence of a bubbling air agitation system. The valleys direct the olives toward the point of initiation of the air bubbling at the bottom of the valleys of the corrugation, thus avoiding dead spots where olives may gather in the processing tank and not be subject to any agitation or to sufficient agitation.

The foregoing description of the invention has been directed to a particular preferred embodiment and for the purpose of explanation. It will be apparent, however, to those of ordinary skill in this art that many modifications and changes in both the apparatus and method of the present invention may be made without departing from the scope and spirit of the invention. For example, the same pump need not be used for both the circulation of the lye solution from the lye storage tank to the processing tank and the introduction of fresh water into the processing tank. Further, a separate overflow line may be provided for fresh water which does not discharge into the lye storage tank. Lye solution temperature, concentration and exposure times can be readily manipulated, or water rinses can be added to the process, without altering the basic principles of the method. It is the applicant's intention in the following claims to cover all such equivalent modifications and variations as fall within the true scope and spirit of the invention.

What is claimed is:

1. A method for producing black ripe olives from olives selected from the group consisting of fresh olives and brine stored olives, comprising:

introducing an alkaline solution, having a concentration of from about 0.45% to about 0.7% by weight for fresh olives and from about 0.9% to about 1.2% by weight for brine stored olives, into a unitary processing tank containing olives to a level which covers the olives in the tank, said processing tank having an open top and a bottom made up of a plurality of corrugations, said corrugations forming a plurality of peaks and valleys extending across said bottom, each valley containing a plurality of spaced-apart holes along the length of said valley;

rapidly agitating the olives by bubbling air through said spaced-apart holes thus forming a plurality of generally circular flows of olives in the processing tank, each one of said flows above each of said valleys;

draining the processing tank of the alkaline solution after a first preselected period of time of between about 4 and 5 minutes so that the olives are exposed to air;

exposing the olives to air, without rinsing, for a second preselected period of time which along with the first preselected period of time totals about one-half hour; and repeating the introducing, draining and exposing steps for a period of time sufficient to achieve a desired oxidation ring in the olives.

2. The method of claim 1 further including the step of:

rinsing the blackened olives with water after the sufficient period of time.

3. The method of claim 1 wherein the air is bubbled in at the valleys of the corrugations, thereby forming generally circular, independent agitation flows of the olives in the processing tank above each valley during the first preselected period of time.

4. The method of claim 3 further comprising:

rinsing the blackened olives, after the sufficient period of time, with fresh water including carbon dioxide dispersed into the fresh water by adding the carbon dioxide at the volute of a centrifugal pump used to pump the fresh water into the processing tank to thereby disperse the carbon dioxide in the fresh water by cavitation in the rotor of the centrifugal pump.

5. The method of claim 3 which further includes viewing the olives through said open top to determine the extent of the circular flow and adjusting the air flow to avoid insufficient agitation of the olives.

6. A method for producing black ripe olives from fresh olives comprising:

introducing an alkaline solution into a unitary processing tank containing fresh olives to a level which covers the olives in the processing tank, said processing tank having an open top and a bottom made up of a plurality of corrugations, said corrugations forming a plurality of peaks and valleys extending across said bottom, each valley having a bottom containing a plurality of spaced-apart holes along the length thereof;

rapidly agitating the olives by bubbling air through the spaced-apart holes thus forming a plurality of generally circular flows of olives in the processing tank, each one of said flows above each of said valleys;

draining the processing tank of the alkaline solution after a first preselected period of time of between about 4 and 5 minutes so that the olives are exposed to air;

exposing the olives to air, without rinsing, for a second preselected period of time, totalling with the first preselected period of time about one-half hour;

repeating the introducing, draining and exposing steps for a sufficient period of time to achieve a desired oxidation ring in the olives; and, rinsing the blackened olives after the sufficient period of time with fresh water containing dispersed carbon dioxide.

7. The method of claim 6 which further includes viewing the olives through said open top to determine the extent of the circular flow and adjusting the air flow to avoid insufficient agitation of the olives.

* * * * *